(12) United States Patent
Gonzalez Granadillo et al.

(10) Patent No.: US 10,419,474 B2
(45) Date of Patent: Sep. 17, 2019

(54) SELECTION OF COUNTERMEASURES AGAINST CYBER ATTACKS

(71) Applicant: INSTITUT MINES-TELECOM/TELECOM SUDPARIS, Evry (FR)

(72) Inventors: Gustavo Gonzalez Granadillo, Evry (FR); Hervé Debar, Palaiseau (FR)

(73) Assignee: INSTITUT MINES-TELECOM/TELECOM SUDPARIS, Evry (FR)

( * ) Notice: Subject to any disclaimer, the term of this patent is extended or adjusted under 35 U.S.C. 154(b) by 77 days.

(21) Appl. No.: 15/526,790

(22) PCT Filed: Nov. 10, 2015

(86) PCT No.: PCT/EP2015/076160
§ 371 (c)(1),
(2) Date: May 15, 2017

(87) PCT Pub. No.: WO2016/075115
PCT Pub. Date: May 19, 2016

(65) Prior Publication Data
US 2017/0324766 A1    Nov. 9, 2017

(30) Foreign Application Priority Data
Nov. 14, 2014 (EP) .................................. 14306809

(51) Int. Cl.
*H04L 29/06*    (2006.01)
(52) U.S. Cl.
CPC .......... *H04L 63/1441* (2013.01); *H04L 63/20* (2013.01); *H04L 63/1433* (2013.01)

(58) Field of Classification Search
CPC ........................ H04L 63/1441; H04L 63/1433
See application file for complete search history.

(56) References Cited

U.S. PATENT DOCUMENTS

| 8,881,288 B1* | 11/2014 | Levy | .................... G06F 21/577 709/225 |
| 2003/0133589 A1* | 7/2003 | Deguillaume | ....... G06K 9/6211 382/100 |

(Continued)

FOREIGN PATENT DOCUMENTS

WO    2007/027131 A2    3/2007

OTHER PUBLICATIONS

Fujimoto, J., "Speculative Attacks with Multiple Targets," CARF Working Paper, Jan. 2014, pp. 1-52.

(Continued)

*Primary Examiner* — Ali Shayanfar
(74) *Attorney, Agent, or Firm* — Oliff PLC

(57) ABSTRACT

A method of selecting, for at least one service of an information system and depending service(s), at least one countermeasure to be implemented against at least one cyber attack, the method includes: identifying elements of the service exposed to the cyber attack(s), calculating a risk mitigation level of each countermeasure with respect to the cyber attack(s), ranking the countermeasure(s) on the basis of a parameter which is at least a function of the risk mitigation level, simulating the impact of the countermeasure(s) on the service and the depending service(s), the countermeasure to be implemented being selected at least as a function of result of the simulation.

11 Claims, 9 Drawing Sheets

(56) References Cited

U.S. PATENT DOCUMENTS

| | | | |
|---|---|---|---|
| 2006/0212932 A1* | 9/2006 | Patrick | H04L 63/1441 726/11 |
| 2007/0016955 A1* | 1/2007 | Goldberg | G06Q 40/08 726/25 |
| 2007/0214224 A1* | 9/2007 | Nam | G06Q 10/107 709/206 |
| 2010/0241478 A1* | 9/2010 | Sahinoglu | G06Q 10/0635 705/7.28 |
| 2012/0213283 A1* | 8/2012 | Ouedraogo | H04N 19/176 375/240.16 |
| 2013/0303120 A1* | 11/2013 | Kusumoto | H04L 63/1416 455/410 |
| 2016/0241580 A1* | 8/2016 | Watters | H04L 63/20 |
| 2016/0241581 A1* | 8/2016 | Watters | G06F 16/904 |

OTHER PUBLICATIONS

Vetillard et al., "Combined Attacks and Countermeasures," International Federation for Information Processing, 2010.

Fan et al., "To Infinity and Beyond: Combined Attack on ECC Using Points of Low Order," CHES 2011, LNCS 6917, 2011, pp. 143-159.

Agarwal et al., "Network Vulnerability to Single, Multiple, and Probabilistic Physical Attacks," The 2010 Military Communications Conference—Unclassified Program—Cyber Security and Network Management, 2010, pp. 1947-1952.

Granadillo, G., "Optimization of cost-based threat response for Security Information and Event Management (SIEM) systems," Institut National des Télécommunications, 2013.

Howard et al., "Measuring relative attack surfaces," Carnegie Mellon University Research Showcase, 2003, pp. 1-22.

Manadhata et al., "Measuring the Attack Surfaces of Two FTP Daemons," 2nd ACM Workshop on Quality of Protection of 2006, 2006.

Manadhata et al., "Measuring the Attack Surfaces of SAP Business Applications," Carnegie Mellon University School of Computer Science, May 2008, pp. 1-19.

Manadhata, P., "An Attack Surface Metric," Thesis, Carnegie Mellon University School of Computer Science, Nov. 2008, pp. 1-147.

Petäjäsoja et al., "IMS Threat and Attack Surface Analysis using Common Vulnerability Scoring System," 35th IEEE Annual Computer Software and Applications Conference Workshops, 2011, pp. 68-73.

Newsham et al., "Windows Vista Network Attack Surface Analysis: A Broad Overview," Symantec Advanced Threat Research, 2006, pp. 1-42.

Fisher, D., "Microsoft Releases Attack Surface Analyzer Tool," Threatpost, Aug. 6, 2012.

Kheir et al., "A Service Dependency Model for Cost-Sensitive Intrusion Response," ESORICS 2010, LNCS 6345, 2010, pp. 626-642.

Kheir, N., "Response policies and counter-measures: Management of service dependencies and intrusion and reaction impacts," Thesis, Ecole Nationale Supérieure des Télécommunications de Bretagne of France, Nov. 25, 2010, pp. 1-217.

Berners-Lee et al., "Uniform Resource Identifier (URI): Generic Syntax," Network Working Group, Standards Track, The Internet Society, Jan. 2005, pp. 1-61.

Touch, J., "Updated Specification of the IPv4 ID Field," Internet Engineering Task Force, Standards Track, Feb. 2013, pp. 1-19.

Cotton et al., "Internet Assigned Numbers Authority (IANA) Procedures for the Management of the Service Name and Transport Protocol Port Number Registry," Internet Engineering Task Force, Best Current Practice, Aug. 2011, pp. 1-33.

Deering et al., Internet Protocol, Version 6 (IPv6) Specification, Internet Engineering Task Force, Standards Track, Jul. 2017, pp. 1-42.

Touch et al., "Service Name and Transport Protocol Port Number Registry," Internet Assigned Numbers Authority, 2017.

Granadillo et al., "Individual Countermeasure Selection based on the Return on Response Investment Index," International Conference Mathematical Methods, Models and Architectures for Computer Network Security, 2012.

Granadillo et al., "Combination Approach to Select Optimal Countermeasures based on the RORI Index," Second International Conference on the Innovative Computing Technology, 2012, pp. 36-45.

Granadillo et al., "RORI-based countermeasure selection using the OrBAC formalism," International Journal of Information Security, 2014, vol. 13, pp. 63-79.

Sonnenreich, W., "Return on Security Investment (ROSI): A Practical Quantitative Model," Journal of Research and Practice in Information Technology, Feb. 2006, pp. 1-7.

Dec. 15, 2015 International Search Report issued in International Patent Application No. PCT/EP2015/076160.

\* cited by examiner

SELECTION OF COUNTERMEASURES AGAINST CYBER ATTACKS

1. TECHNICAL FIELD

The present invention relates to an improved data processing system; and in particular to a method for selection of an appropriate countermeasure for implementation against complex and known cyber attacks.

2. DESCRIPTION OF RELATED ART

Innovation in Information Technology has brought numerous advancements but also some consequences. Cyber attacks have evolved along with technology, reaching a state of high efficiency and performance that makes the detection and reaction process a challenging task for security administrators. In addition, network and system devices have been designed to support heterogeneous environments with different characteristics and functionalities that increase the difficulty of this task.

Current research focuses on approaches to detect such sophisticated attacks and to demonstrate their robustness and the difficulty in their mitigation. This is for example the objective of the paper by Fujimoto J. entitled "*Speculative attacks with multiple target*" available on the website of Center for Advanced Research in Finance of Tokyo University or in the work by Vetillar E. et al. under the name "*combined attacks and countermeasures*" for International Federation for Information Processing. Similar topics have also been discussed during the lecture named "*To infinity and beyond: Combined attack on ECC using points of low order*" by Fan K. et al during the 13$^{th}$ International conference on cryptographic hardware and embedded systems or by Agarlwal P. et al. under the name "*Network vulnerability to single; multiple and probabilistic physical attacks*" in the Military Communication Conference of 2010.

On the contrary, research on mitigation strategies receives considerably less attention, owing to the inherent complexity in developing and deploying responses in an automated fashion. Mitigation strategies are part of a reaction process that requires security administrators to remediate to threats and/or intrusions by selecting appropriate security countermeasures.

The definition of countermeasures to protect these systems is a process that requires a great expertise and knowledge. Inappropriate countermeasures may result in disastrous consequences for the organization, as shown in the work of Gonzalez Granadillo under the name "*Optimization of cost-based threat response for security information and event management systems*" available in the library of University Paris 6. Typically, the selection of a given countermeasure requires a manual intervention of security operators. No appropriate assessment of the countermeasure impact over the system is currently performed, and service dependencies among the numerous components of large systems in complex environments are not considered.

There is a need for automated mitigation strategies addressing multiple and complex cyber attacks that enable to select optimal countermeasures that are efficient in stopping the attack and preserve, at the same time, the best service to legitimate users. An attack surface with regard to an information system being attacked is defined as a model that measures quantitatively the level of exposure of a given system, i.e., the reachable and exploitable vulnerabilities existing on the system.

Howard et al., in their work "*Mitigate security risks by minimizing the code you expose to untrusted users*" available on the website of Microsoft Developer Network and "*Measuring relative arrack surfaces*" of the publication "*Computer Security in the 21$^{st}$ Century*", consider three dimensions to determine the attack surface of an operating system (e.g. Linux, Windows): Target and enablers, Channels and protocols, and Access rights. However, the approach does not provide a systematic method to assign weights to the attack vectors; it focuses on measuring the attack surfaces of operating systems; and it is not possible to determine if all attack vectors have been identified.

Manadhata et al. in their work "*Measuring the attack surfaces of two FTP daemons*" from the 2$^{nd}$ ACM Workshop on Quality of Protection of 2006, "*Measuring the attack surfaces of SAP Business Applications*", and two publications under the name "*An attack surface metric*" available on the website of School of Computer Science of Carnegie Mellon University, measure the attack surface of a software system (e.g., IMAP server, FTP daemons, Operating Systems) based on the analysis of its source code, through three dimensions: methods, channels, and data. However, in the absence of source code, the proposed methodology is useless. The damage potential estimation includes only technical impact (e.g., privilege elevation) and not monetary impact (e.g., monetary loss).

The model only compares the level of attackability between two similar systems; no attempt has been made to compare the attack surface of different system environments. The method does not make assumptions about the capabilities of attackers or resources in estimating the damage potential-effort ratio. The methodology does not allow the security administrator to evaluate multiple attacks occurring simultaneously in a given system.

Petajasoja et al. propose in his work "*IMS threat and attack surface analysis using common vulnerability scoring system (CVSS)*" for the 35th IEEE Annual Computer Software and Applications Conference Workshops, an approach to analyze a system's attack surface using CVSS. As a result, it is possible to identify most critical interfaces in order to prioritize the test effort. However, this approach limits the attack surface to known vulnerabilities, it is not meant to be used as a reaction strategy and only compares relative security of similar infrastructures.

Microsoft has recently developed an attack surface analyzer tool, as taught in "*Windows Vista Network Attack Surface Analysis: A broad overview, Symantec, Advance Threat Research*" available on the website of Symantec and "*Microsoft releases attack surface analyzer tool*" available on the website of Threatpost, that identifies changes made to an operating system attack surface by the installation of new software. However the tool can be used only for Windows operating systems and is useless to measure a network attack surface.

3. SUMMARY OF THE INVENTION

Taking into account the aforementioned limitations, the present invention aims to provide a method of selecting, for at least one service of an information system and depending service(s) of the service, at least one countermeasure to be implemented against at least one cyber attack, the method comprising:
  identifying elements of the service exposed to the cyber attack(s),
  calculating a risk mitigation level of each countermeasure with respect to the cyber attack(s), ranking the countermeasure(s) on the basis of at least the risk mitigation level, simulating the impact of the countermeasure(s) on the service and the depending service(s), the countermeasure to be implemented being selected at least as a function of the result of the simulation.

The invention makes it possible to assess impact of countermeasures before their selection and if appropriate, their enforcement on the service and on the depending services.

A service is defined as an entity that implements interfaces by which it requires access to assets and/or provides access to other assets, as defined in "*A service dependency model for cost-sensitive intrusion response*" of Nizar KHEIR et al. available in the publication "*Proceedings of the 15th European Symposium on the Research in Computer Security*". A service dependency is accordingly the expression of the need, for a service, to access another service during its operation.

A service may be performed by an information system, which is defined as a computerized database configured to accept, store, process, transform, make useful, and analyze data and to report results, usually on a regular, ongoing basis. It is often construed as a larger system including not only the database and the software and hardware used to manage it but also including the people using and benefiting from it and also including all necessary manual and machine procedures and communication systems.

An information system may provide one or a plurality of services. A service may require and/or provide access to other services. A depending service of a given service can be either a dependent or an antecedent service of said given service. Typically, the information service and its depending services compose the information system.

The method may comprise identifying depending service(s) of the at least one service of the information system.

The method may comprise identifying dependencies among the service(s). The identification of service dependencies may imply, among others, identifying elements employed simultaneously by the services(s).

The determination of the dependency between a service and its depending services can be performed using methods taught in the document "*Management of service dependencies and intrusion and reaction impacts*" to Nizar KHEIR available in the library of Ecole Nationale Supérieure des Télécommunications de Bretagne of France.

Preferably, the method comprises simulating attack propagation between the services.

The method may thus allow selection of a common countermeasure for a plurality of services.

Components of a computer-based information system may include, among others, hardware, software, data and procedures.

These components may define, for a service provided by the system, elements of different types, i.e. categories. For example, the different element types may be, among others, user account, resource, and channel of the service. Different services provided by the system may involve the use of different elements of the above mentioned element types.

A user account is a unique identifier for a user in a given system that allows him/her to connect and interact with the system's environment. A user account is generally defined by a user name or login name associated with a password. A user account is associated to a given status in the system, from which his/her privileges and rights are derived (i.e. super administrator, system administrator, standard user, guest, internal user, or nobody).

A resource is either a physical component (e.g. host, server, printer) or, a logical component (e.g. files, records, database) of limited availability within a computer system. From the URI generic syntax, 3 elements can be exploited to have access to a given resource (i.e. path, query, and fragment). The path section of a URI contains data organized in hierarchical form, which along with the non-hierarchical query component, serves to identify a resource. In addition, the query and fragment sections of a given allow indirect identification of a secondary resource, as taught in the publication "*Uniform Resource Identifier (URI)*" by Berners-Lee. T et. al. available on the website of Internet Engineering Task Force (IETF).

In order to have access to a particular resource, a user account must use a given channel. IP addresses and the port numbers are examples of channels in TCP/IP connections. Use of IP addresses are for example illustrated in the work "*DOD Standard Internet Protocol*" provided by Information sciences institute university of Southern California, "*Updated Specfication of the IPv4 ID Field*" by J. Touch, "*Internet assigned numbers authority (LANA) procedures for the management of the service name and transport protocol port number registry*" by M. Cotton et al and "*Internet Protocol, Version 6(IPv6)*" by S. Deering et al., which are available on the website of Internet Engineering Task Force (IETF). Example of use of port numbers can be found in the work "*Service name and transport protocol port number registry*" by J. Touch available on the website of Internet Assigned Numbers Authority (IRNA).

However, each organization must define the way its users connect to the system and have access to the organization's resources.

All element types of a service may not be susceptible to be attacked by a given cyber attack.

Element types susceptible to be attacked by a cyber attack may comprise the above mentioned types, i.e. user account, resource, and channel.

When an element type is susceptible to be attacked by a given attack, all elements of said element type may not be exposed to the given attack. For example, a given attack may affect only a part of the elements of an element type susceptible to be attacked by said given attack.

The risk mitigation level of a countermeasure with regard to an attack and/or attacks may be calculated as a function of at least a coverage of the countermeasure with regard to the attack and/or attacks, wherein the coverage of a countermeasure with regard to an attack and/or attacks is defined as a function of at least a volume of the countermeasure and of the attack(s).

For example, the countermeasure coverage can be calculated as a ratio between an intersecting volume of the volume of the countermeasure and of the attack(s), and the volume of the attack(s).

Preferably, the risk mitigation level is calculated as a function of at least the effectiveness of the countermeasure and the coverage of the countermeasure, for example a product of the countermeasure effectiveness and its coverage.

The countermeasures may be ranked on the basis of a parameter which is at least a function of the risk mitigation level. Said parameter is preferably configured to evaluate among others, the speed, the effectiveness and/or the efficiency of the countermeasure.

For example, a cost-sensitive parameter called Return On Response Investment (RORI) that evaluates individual and combined countermeasures by balancing their effectiveness and cost may be used. The work of Gonzalez Granadillo et al. published as "*Individual countermeasure selection based on the return on response investment index*" during the International Conference Mathematical Methods, Models and Architectures for Computer Network Security of 2012, "*Combination approach to select optimal countermeasures based on the RORI index*" during the Second International Conference on the Innovative computing Technology, and "*RORI-based countermeasure selection using the OrBAC formalism*" in the International Journal of Information Security, Vol. 13(1) of 2014, illustrates the use of the RORI for evaluating countermeasures. Effectiveness is assessed on the ability of a countermeasure to cover the vulnerabilities exploited by a given attack, whereas the cost includes the expenses of implementing, maintaining, and deploying a given security countermeasure.

The countermeasure(s) to be selected can be one of a known countermeasure such as behavioral detection, installing antivirus, making all shares "read only", installing patches, blocking common and control domains, creating signatures IDS, the list not being limited.

Alternatively, a countermeasure can be defined specifically in response to a given attack.

A simulation of the impact of a countermeasure may comprise information concerning a degree of damage that the countermeasure may cause to the system, i.e. to services of the system, and/or to its depending services A degree of a damage of a countermeasure is defined as the negative impact originated out of the implementation of a given countermeasure. For example, if a countermeasure causes casualties to the system, it would not be retained. The degree of degree may be selected from a qualitative scale. For example, the scale may include levels of damage ranging from "very low", "low", "medium", "high", "very high" to "extreme". Preferably, a countermeasure having a degree of damage that goes beyond "high" is not selected.

A trade-off between the protection and the damage brought by the implementation of the countermeasure may be made in order to determine whether the countermeasure could be implemented.

An appropriate countermeasure may eventually be not doing anything at all.

A volume of the countermeasure and of the attack can be calculated in an n-axes coordinate system with n being an integer superior to 2.

Preferably, the axes of the n-axes coordinate system correspond to the element types of the service that are exposed to attacks. For example the axes may be selected from at least the user accounts, the channels and the resources of the information system. These axes are preferably of element types complementary to each other.

Preferably, n is equal to 3. In this case, the method may comprise displaying the volumes of the attacks and of the countermeasures in the 3 axes coordinate system.

Their projection results into a cube or a parallelepiped with a corresponding volume in the system.

For example, the 3 axes can be the user accounts, the channels and the resources of the information system.

A weighting factor may be assigned to each axis. This allows assigning priorities to each element type. The weighting factor may be assigned based on the CARVER methodology as illustrated in "*Risk analysis and security countermeasure selection*" by Norman. T and "*Special operations forces intelligence and electronic warfare operation, Appendix D: Target analysis process*" available on the website of Federation of American Scientists. Further explanation will be provided with regard to FIG. 2.

In the case when there is more than one attack, the method may comprise calculating the union and intersection of the attacks. In the case when there is more than one countermeasure, the method may comprise calculating the union and intersection of countermeasures.

This allows modeling the impact combination of attacks as well as the effectiveness and cost of a combination of countermeasures.

The method may comprise calculating a volume of the service in the n axes coordinate system.

This allows, when the volumes of the service, of the attacks and of the countermeasures are displayed, to visualize elements that are simultaneously affected by different attacks and/or countermeasures.

This graphical representation also allows to visualize the magnitude of the attacks on the service and to determine graphically whether two attacks are isolated or not and/or whether two countermeasures can be combined.

The union and intersection of the different volumes may be computed by using geometrical operations.

The method may comprise select a combination of a plurality of countermeasures, for example a combination of at least two countermeasures.

In another aspect, the present invention proposes a geometrical approach to model an attack volume of an information system in a 3-dimension coordinate system, comprising
  identifying elements of the system exposed to attacks using information derived from a Uniform Resource Identifier), the element being for example of types selected from at least the user accounts, the channels and the resources of the information system, and
  assigning a weighting factor to each element type, wherein each axis in the 3-dimension coordinate system corresponds to one element type.

Since the axes information is derived from a URI, a bijection between the Is and the coordinate system is required in order to make the appropriate transformations.

Since the three axes in the coordinate system are independent, the bijection from a to the coordinate system implies three bijections (one for each axis). For those cases where the information of one axis is missing, the following approaches are proposed:
  The "optimistic" approach. which suggests working in a 2-dimensional system by eliminating the axis that does not provide any information. In this case the geometrical figure will be a surface instead of a volume, but the methodology is the same.
  The "pessimistic" approach, which suggest using the whole axis, making the assumption that the value of the axis is the same for all the possible cases. In this case, the geometrical figure will be a volume.

Specific embodiments of the invention will now be described in some further detail with reference to and as illustrated in the accompanying Figures. Theses embodiments are illustrative, and not meant to be restrictive of the scope of the invention.

FIGS. 8A-8D are pictorial representations of a number of different scenarios in which multiple and complex attacks directed at a system can occur in accordance with aspects of the present invention; and.

An information system according to the present application may be a computer-based information system as defined above.

Hardware of the system may include the computer itself, which is often referred to as the central processing unit (CPU), and all of its support equipments. Among the support equipments are input and output devices like keyboards and display screens, storage devices and communications devices.

Software of the system may comprise computer programs and the manuals, if any that support them. Computer programs are machine-readable instructions that direct the circuitry within the hardware parts of the system to function in ways that produce information from data. Programs are generally stored on some input/output medium, often a disk or tape.

Data are facts that are used by programs to produce information. Like programs, data are generally stored in machine-readable form on disk or tape until the computer needs them.

Procedures are the policies that govern the operation of a computer system.

For example, a dedicated program of the system may be used for detection of attacks.

Preferably, a program is created for implementation of a method according to the present invention. When an attack is detected, the method can be run by said program.

The system may comprise data of countermeasures corresponding to respective known attacks Upon detection of attack(s), selection of an optimal countermeasure against the attack(s) can be done among others, out of these pre-stored countermeasures.

Figure 1:
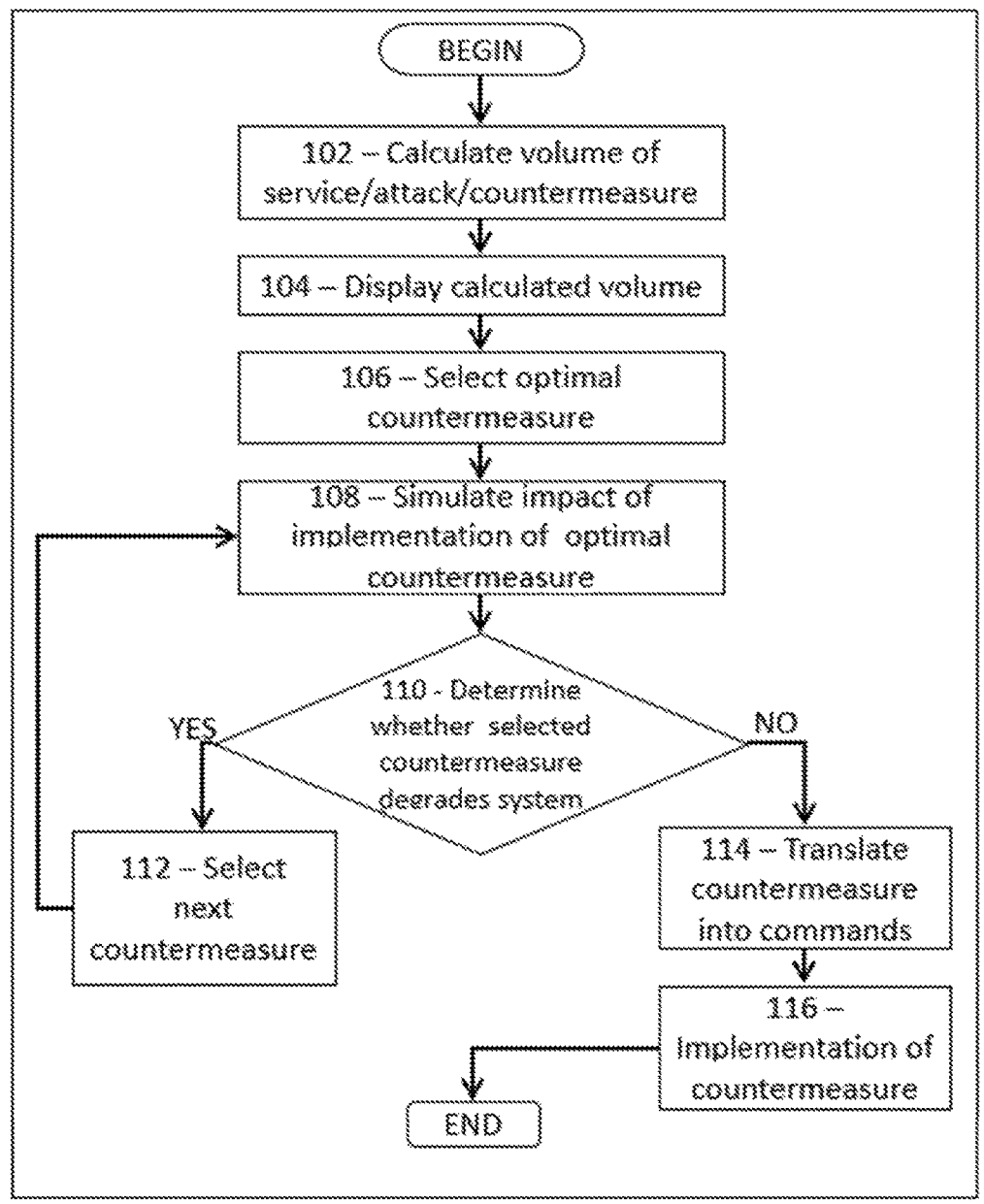
FIG. 1 is a flowchart illustrating an example of a method of selecting, for at least an information system and its depending services, at least one countermeasure to be implemented against at least one cyber attack according to the present invention.

In the exemplary embodiment illustrated in FIG. 1, the method begins by a step 102 of calculating a volume of the at least one service, attack, and countermeasure. The calculation of each volume performed in the step 102 is described in detail hereafter in FIG. 2, FIG. 3, and FIG. 4 respectively.

Next, the method may comprise a step 104 for displaying each calculated volume. In the illustrated embodiment, the volumes are represented graphically, for example by means of the display screen, in a 3-dimensional coordinate system. Such representation allows the identification of joint attacks and countermeasures.

When volumes of a plurality of services are calculated, dependencies between the services can be identified by, for example identifying elements of different element types, i.e. users, channels and resources that are used simultaneously by different services. Each attack can be associated to one or more security countermeasures. When two or more countermeasures could be applied to mitigate the effects of a same given attack, a trade-off, for example between their time of implementation and their scope of protection, is required.

In the step 106, optimal countermeasure(s) are selected out of a list of possible countermeasures ranked on the basis of at least the risk mitigation level of each given countermeasure with regard to the attack(s). For example, a coverage of a countermeasure with regard to the attack(s), which is a ratio between an intersecting volume of the volume of the countermeasure and of the attack(s), and the volume of the attack(s), can be used to calculate the risk mitigation level of the countermeasure.

Of course, other parameters being a function of at least the risk mitigation level can be used for ranking the countermeasure. For example, a cost sensitive parameter referred to as Return On Response Investment (RORI) is described in FIG. 4, (step 412).

Once the countermeasures are ranked, an optimal countermeasure on the basis of at least the risk mitigation level can be selected. The system simulates, in a step 108, the technical impact of its implementation over affected service of the system and its depending services. A determination is then made as whether the implementation of the selected countermeasure degrades the system or any depending services as illustrated in step 110, on the basis of a degree of damage being defined as the negative impact on the system originated out of the implementation of a given countermeasure.

The method may comprise evaluating in this step how one security countermeasure affects antecedent and dependent services. It may calculate residual risk and potential collateral damage that may result from the implementation of a particular countermeasure.

In case of system degradation beyond the tolerable degree of damage, the method selects the next countermeasure on the list as illustrated in step 112 and returns to step 108; otherwise, the countermeasure is translated into appropriate commands as shown in step 114. The commands are going to be understood by the policy enforcement point for its implementation in step 116, and the process terminates.

Processes for performing different steps of the method are illustrated through FIGS. 2 to 5B.

Figure 2:
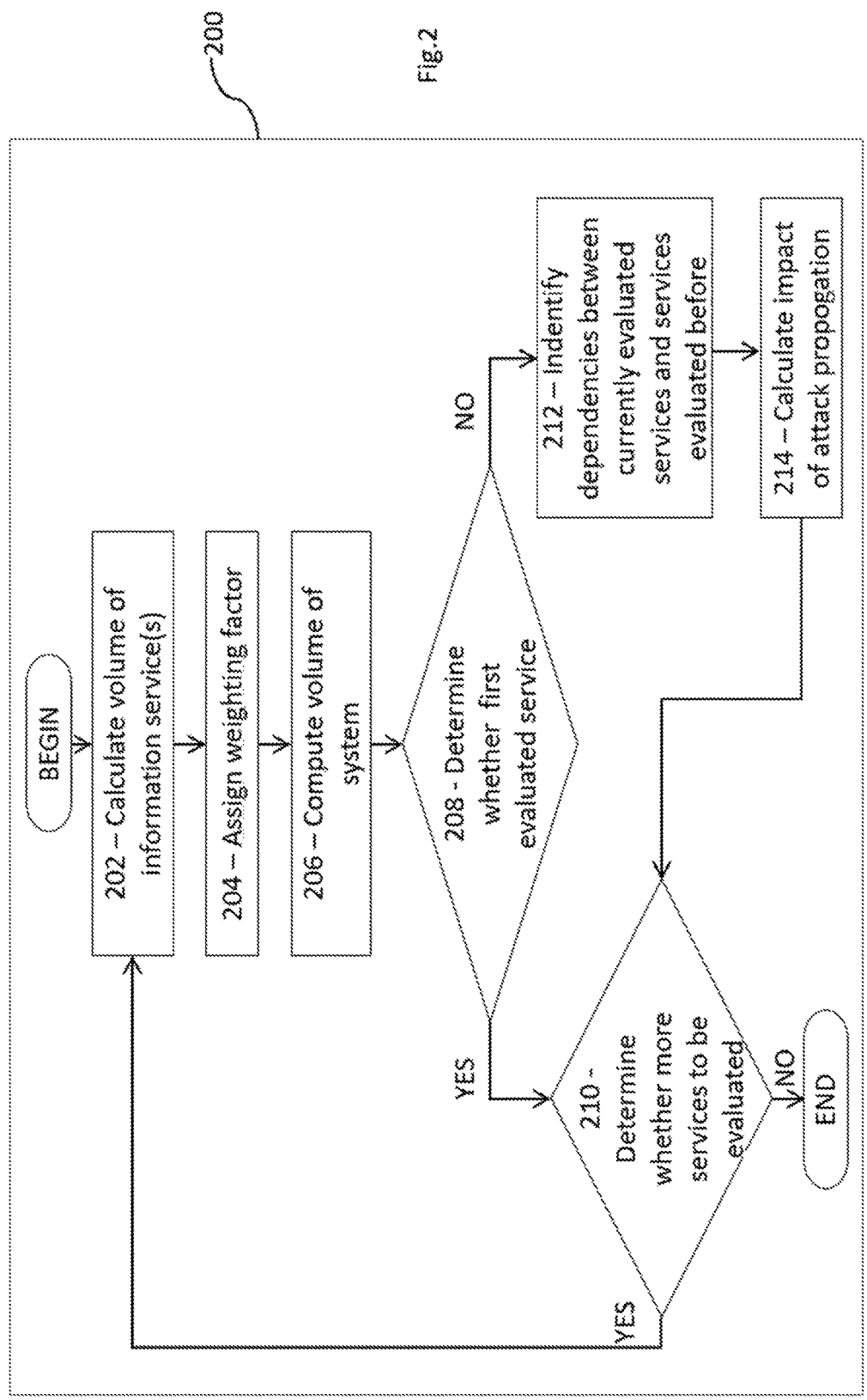
FIG. 2 illustrates calculating the volume of information system(s) in accordance with aspects of the present invention.

A process for calculating the volume of the information service(s) in accordance with aspects of the present invention begins by in a step 202, as illustrated in FIG. 2, in which all elements from the services and that are exposed to the attacks are identified. Such elements can belong to different element types.

In all the illustrated embodiments, element types to be used for calculating the different volumes will be user account, channel and resource.

Next, in a step 204, a weighting factor is assigned to each element type, for example based on the CARVER methodology cited before. The methodology evaluates 6 criteria (criticality, accessibility, recuperability, vulnerability, effect, and recognizability) in order to measure the priority of each element in the system.

Examples of weighting assignments are shown in Table I below.

TABLE I

| Attack Dimension | C | A | R | V | E | R | Total | % | Weighting Factor |
|---|---|---|---|---|---|---|---|---|---|
| User Account | 8 | 7 | 9 | 7 | 8 | 7 | 46 | 40 | 2 |
| Channel | 5 | 6 | 5 | 6 | 5 | 4 | 31 | 28 | 1 |
| Resource | 7 | 6 | 6 | 5 | 7 | 5 | 36 | 32 | 1.5 |

Once the weighting factor is assigned to each element type, next step 206 comprises computing the volume of the system.

The volume of service S is represented by the vector $SV(S)=(Co_{Ace}(S), Co_{Ip\text{-}port}(S), Co_{Res}(S))$ in a 3-axis coordinate system, wherein the 3 axis being respectively user account, resource, channel of the service and $Co_{Ace}(S)$ is the number of total user accounts of the service, $Co_{Ip\text{-}port}(S)$ the number of total channels of the service and $Co_{Res}(S)$ the number of total resources of the service.

The volume of the service is calculated as the product of the axis contribution of each elements type and its corresponding weighting factor, i.e. $SV(S)=\Pi Co_{Axis}(S) \times WF_{type}$.

A determination is then made in a step 208 as whether it is the first evaluated service. If it is the first evaluated service, a determination is made as whether there are more services to be evaluated, as shown in step 210. If it is the case, the process returns to step 202, and calculate a volume of the depending services of said service. Otherwise, the process terminates. In case it is not the first evaluated service, dependencies are identified between the currently evaluated service and the services evaluated before in a step 212 and an impact of attack propagation is then calculated based on their dependencies as shown in step 214. The process then r s to step 210 as described above.

Figure 3:
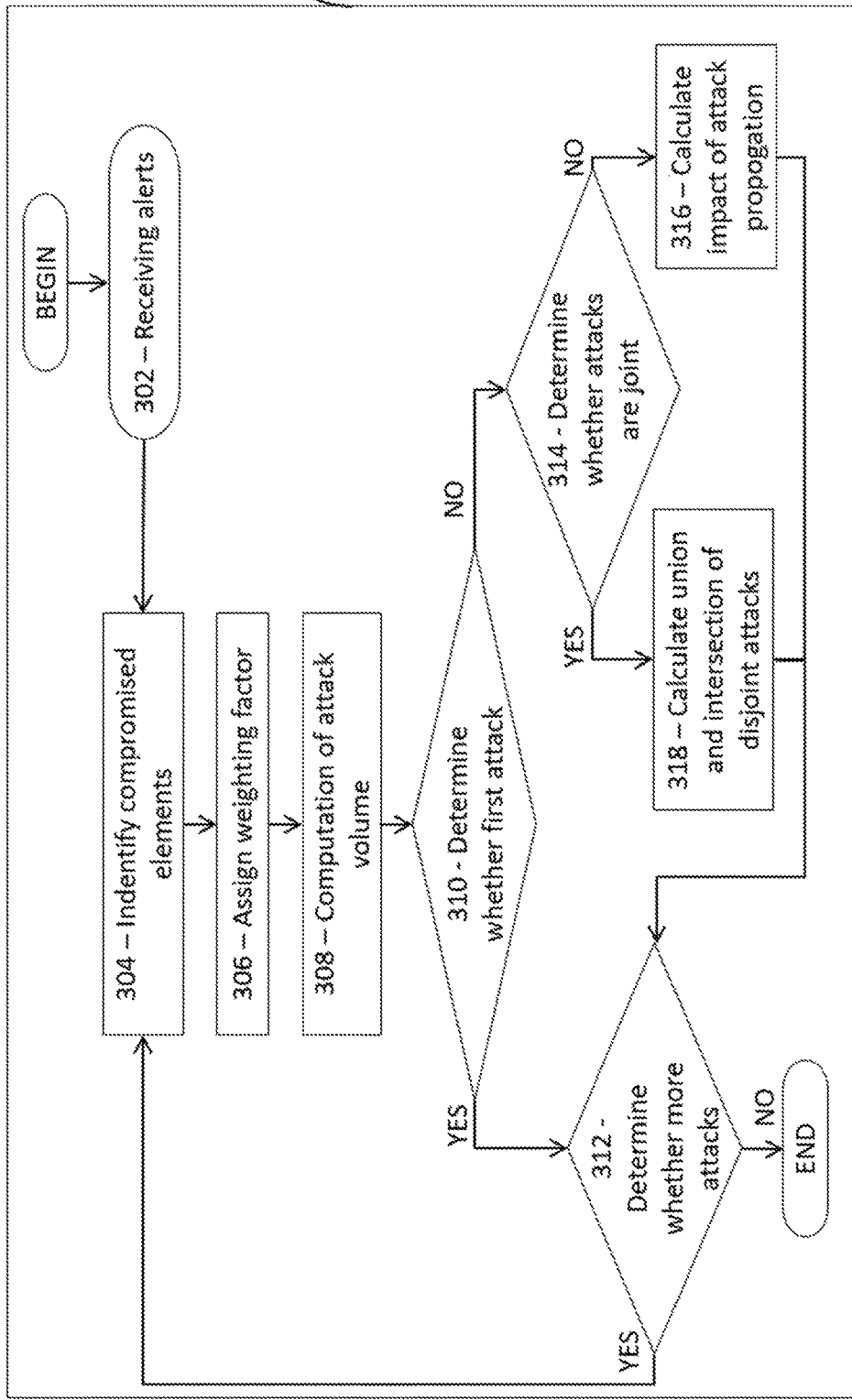
FIG. 3 illustrates calculating the volume of attack(s) in accordance with aspects of the present invention.

FIG. 3 depicts a flowchart of a process 300 used for calculating the volume of attack(s) in accordance with aspects of the present invention (step). The process begins by receiving, in a step 302, alerts which contain information about attacks and/or intrusions. In the current application, an intrusion refers to an attack that does not necessarily degrade the system, for example in the case of a sniffer.

The process identifies, in a step 304, all elements of the service compromised by the detected attack and groups them into one of the element types selected from user account, resource, and channel, as performed in step 202 in FIG. 2. Next, a weighting factor is assigned to each element type in a step 306, as detailed above with regard to step 102 in FIG. 2. Preferably, the weighting factors assigned to each element type is the same as those used for calculating the volume of the service(s).

Next step 308 is the computation of the attack volume. The volume of attack A is represented by the vector $AV(A)=(Co_{Acc}(A), Co_{Ip\text{-}port}(A), Co_{Res}(A))$ in the 3-axis coordinate system as detailed above with regard to FIG. 2, wherein $Co_{Acc}(A)$, $Co_{Ip\text{-}port}(A)$ and $Co_{Res}(A)$ represent respectively the user accounts, the channels and the resources compromised by the attack A.

The attack volume is calculated as the product of the axis contribution of each element type and the corresponding weighting factor of the element type (i.e., $AV(A)=\Pi Co_{Axis}(A) \times WF_{type}$).

A determination is then made in a step 310 as whether it is the first evaluated attack. If it is the first evaluated attack, a determination is made in a step 312 as whether there are more attacks to be evaluated, if it is the case, the process returns to step 304, otherwise the process terminates.

In case it is not the first evaluated attack, a determination is made in a step 314 as whether the detected attacks are joint, if it is the case, the process calculates a union and intersection of joint attacks in a step 316 and it returns to step 312.

The union is calculated as the sum of the individual attack volumes minus their intersections, and the intersection volume is calculated as the sum of the individual attack volumes minus their union. If attacks are disjoint, the process calculates the union and intersection of disjoint attacks in a step 318 and it returns to step 312. For disjoint attacks, the attack volume union is calculated as the sum of their individual volumes, and the attack volume intersection is equal to 0.

Figure 4:
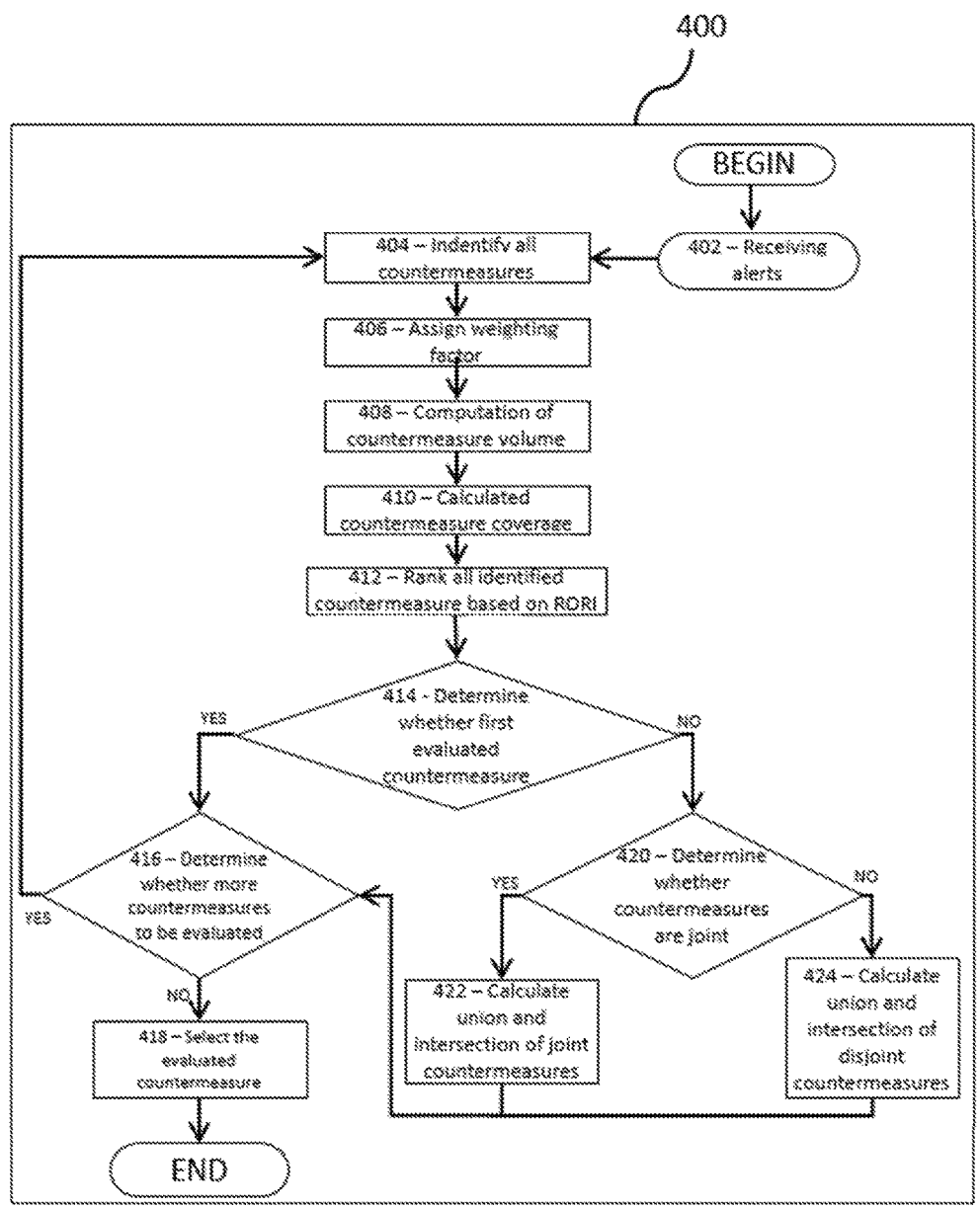
FIG. 4 illustrates calculating the volume of security countermeasure(s) in accordance with aspects of the present invention.

FIG. 4 depicts a flowchart of a process 400 used for calculating the volume of security countermeasure(s) in accordance with aspects of the present invention. The process 400 begins by a step 402 in which the system receives a signal that an attack has been realized on the system. The process 400 identifies in a step 404 all security countermeasures that could protect all compromised elements on the system. The process may also comprise receiving in this step 404 information about associated cost and benefits of each countermeasure. Then, a weighting factor is assigned to each element type comprised by the system in a step 406, as detailed in FIG. 2, step 204. Preferably, the weighting factors assigned to each element type is the same as those used for calculating the volume of the service(s) and the attack(s).

Next step 408 is the computation of the countermeasure volume. The volume of countermeasure C is represented by the vector $CV(C)=(Co_{Acc}(C), Co_{Ip\text{-}port}(C), Co_{Res}(C))$ in the same 3-axis coordinate system as detailed above with regard to FIG. 2, wherein $Co_{Acc}(C)$, $Co_{Ip\text{-}port}(C)$ and $Co_{Res}(C)$ represent respectively the user accounts, the channels and the resources that can be protected by the countermeasure C.

The countermeasure volume is calculated as the product of the axis contribution of each element type and its corresponding weighting factor, i.e., $CV(C)=\Pi Co_{Axis}(C) \times WF_{type}$.

A countermeasure coverage is then calculated in a step 410. The coverage (cov) of a given countermeasure (C) with respect to a given attack (A) is calculated as the ratio between the countermeasure volume overlapping with the attack volume and the attack volume $cov(C,A)=CV(C) \cap AV(A)/AV(A)$. As a result, the higher the ratio, the greater the risk mitigation level.

When a plurality of attacks are joint, a coverage of a given countermeasure (C) can be calculated for the plurality of attacks (A1, A2 . . . An) as a ratio between the countermeasure volume overlapping with the union of the attacks volumes, and the union of the attack volumes.

Figure 5A:
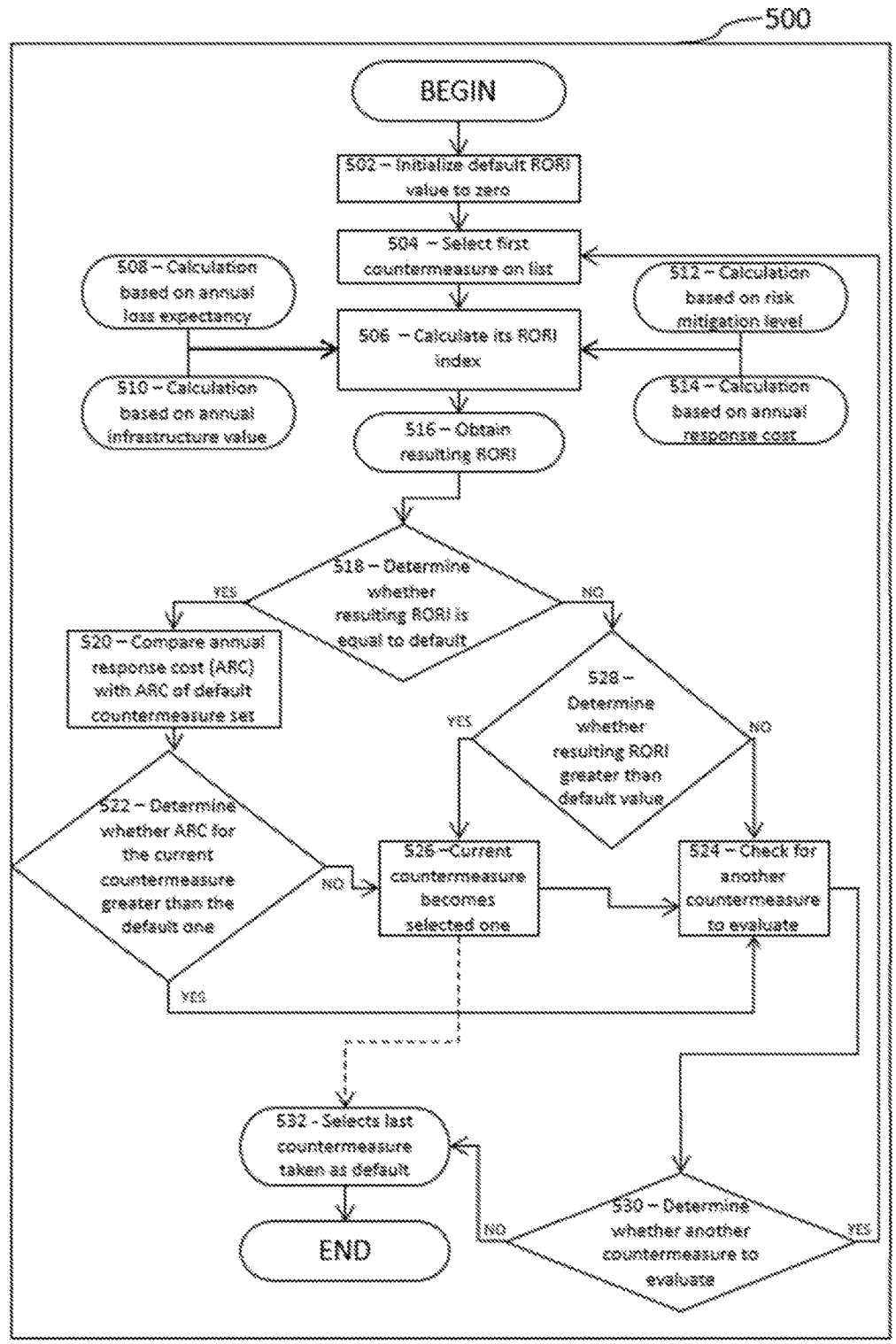
FIGS. 5A-5B illustrate selecting a countermeasure or combination of countermeasures in accordance with aspects of the present invention.
Figure 5B:
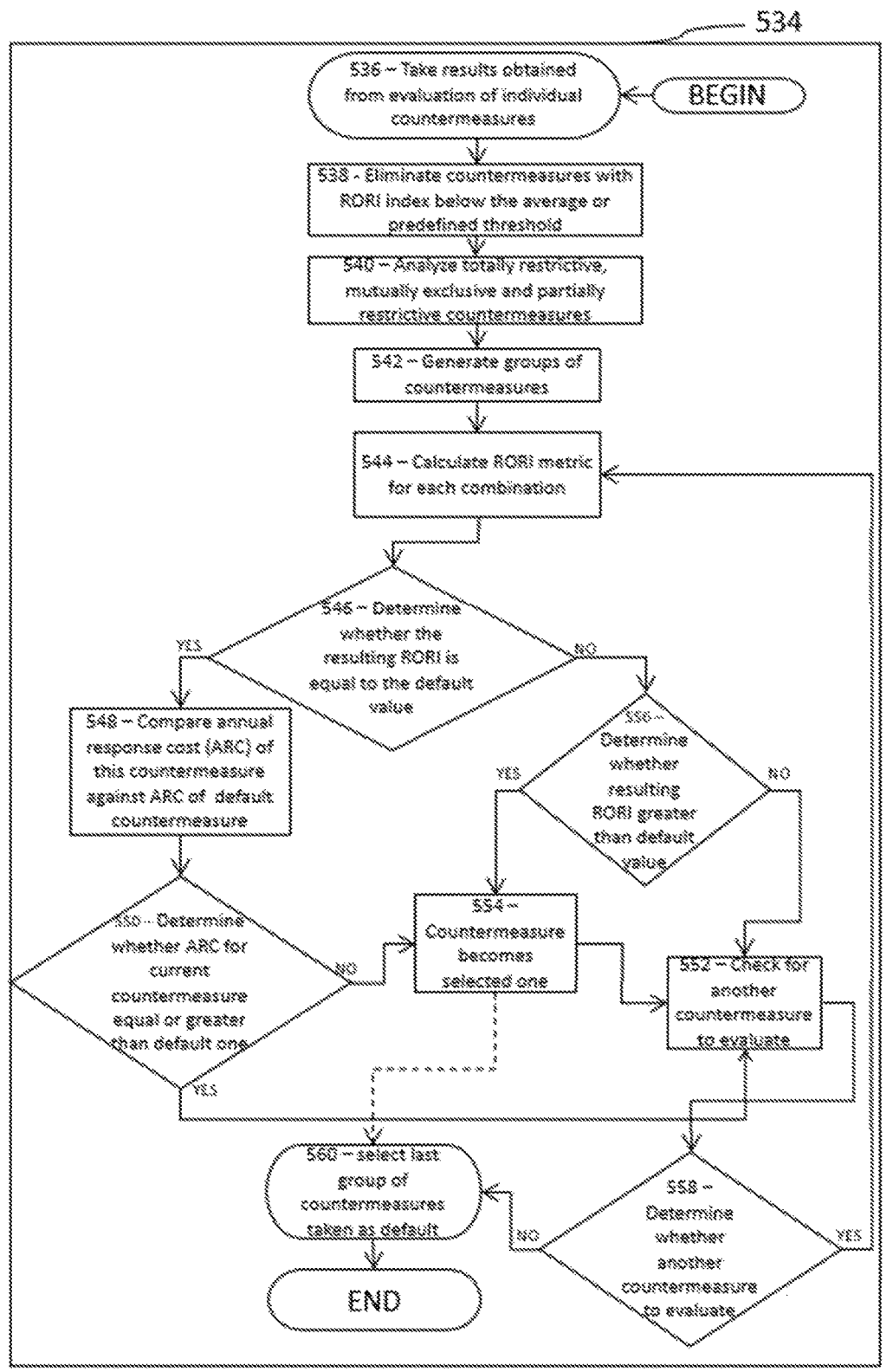

Next, the process ranks all the identified security countermeasures on the basis of a predefined parameter which is at least a function of the risk mitigation level of a countermeasure. In the illustrated embodiment as shown in FIGS. 4, 5A and 5B, a parameter referred to as RORI, which is for example defined by Kheir N. et al, in their work "A Service Dependency Model for Cost-Sensitive Intrusion Response" available in Proceedings of the 15th European Symposium on Research in Computer Security (ESORICS) or in the work of Kheir N. under the name "*Response Policies and Countermeasures: Management of Service Dependencies and Intrusion and Reaction Impacts*" at Ecole Nationale Supérieure des Télécommunications de Bretagne of France.

"*Response Policies and Countermeasures: Management of Service Dependencies and Intrusion and Reaction Impacts*" introduced the Return On Response Investment (RORI) index as an extension of the Return On Security Investment (ROSI) index defined by Sonnenreich W. et al. in the article "*Return On Security Investment (ROSI)—A Practical Quantitative Model*" in the Journal of Research and Practice in Information Technology of February 2006.

The RORI not only evaluates the efficiency of a given security solution by the calculation of the ratio between its cost of implementation and benefit, but also considers the impact of the attack over a given system, and the organization infrastructure value. However, RORI suffered from few drawbacks, including the difficulty to estimate the parameters or the inability to compute it when no countermeasure is selected, following what has been done in the above mentioned works of Kheir N. et al.

The present invention adjusts the proposed RORI model to select the countermeasure that provides the highest benefit to the organization in terms of security investment. An improvement, has been proposed as follows in the above mentioned work of Gonzalez Granadillo under the name "*Optimization of cost-based threat response for security information and event management systems*" available in the library of University Paris 6:

$$RORI = \frac{(ALE \times RM) - ARC}{ARC + AIV} \times 100$$

Where:
ALE is the Annual Loss Expectancy and refers to the impact cost suffered in the absence of security measures. ALE is expressed in currency per year and will depend directly on the attack's severity and likelihood.
RM refers to the Risk Mitigation level associated to a particular solutionranges between zero and one hundred percent. In the absence of countermeasures, equals 0%.
ARC is the Annual Response Cost that is incurred by implementing a new security action. It corresponds to the sum of the operation cost (including setup and deployment costs) and the collateral damage costs (the cost added by the security measure) of the previous RORI index. ARC is always positive and is expressed in currency per year.
AIV is the Annual Infrastructure Value (including cost of equipment, services for regular operations, etc.) that is expected from the system, regardless of the implemented countermeasures. ARC is always strictly positive and expressed in currency per year.

Of course, another parameter capable of evaluating and ranking the efficiency of the identified security countermeasures on the system and its dependencies can be used without going beyond the scope of the current invention.

A determination is then made in step 414 as whether it is the first evaluated countermeasure. In such a case, a determination is made in step 416 as whether there are more countermeasures to be evaluated, if it is the case, the process return to step 404, otherwise the process selects the evaluated countermeasure as the optimal solution in a step 418 and it terminates.

In case it is not the first evaluated countermeasure, a determination is made in step 420 as whether the countermeasures are joint, if it is the case, the process calculates the union and intersection of joint countermeasures in a step 422 and it returns to step 416. The union is calculated as the sum of the individual countermeasure volumes minus their intersections, and the intersection volume is calculated as the sum of the individual countermeasure volumes minus their union. If countermeasures are disjoint, the process calculates the union and intersection of disjoint countermeasures in a step 424 and it returns to step 416. For disjoint countermeasures, the union is calculated as the sum of their individual volumes, and the intersection is equal to 0.

FIGS. 5A-5B are flowcharts of processes used for selecting countermeasures in accordance with aspects of the present invention.

FIG. 5A depicts a process 500 of selecting individual countermeasures for complex attack scenarios. The process starts by initializing the default RORI value to zero in a step 502, making RM and ARC parameters equal to 0, since no countermeasure is implemented. Then, the process selects the first countermeasure on the list in a step 504 and calculates its RORI index in a step 506, based on the annual loss expectancy (ALE) calculated in a step 508, annual infrastructure value (AIV) calculated in a step 510, risk mitigation level (RM) calculated in a step 512, and annual response cost (ARC) calculated in 514.

The resulting RORI is obtained in a step 516 and is compared with the one by default set in the step 502. A determination is made in a step 518 on whether the resulting RORI is equal to the default. In such a case, the system compares the annual response cost (ARC) of this countermeasure with the ARC of the default countermeasure set in a step 520. A determination is then made in a step 522 as whether the ARC for the current countermeasure is greater than the default one. In such a case, the system, in a step 524, discards the countermeasure and search for another one to be analyzed; otherwise the countermeasure becomes the selected one in a step 526, and it overrides the default RORI value. It may happen that, when comparing the costs of two countermeasures, they are exactly the same. In such a case, the system keeps the current RORI value as the default one and checks for another solution to evaluate.

In case the resulting RORI is different to the default one, a determination is made in a step 528 as whether the resulting RORI is greater than the default value. In such a case, the countermeasure becomes the selected one in a step 526; otherwise, the system, in a step 524 checks for another countermeasure to evaluate and the default RORI remains unchanged. A determination is made in a step 530 as whether there is another countermeasure to evaluate, in such a case, the process returns to step 504; otherwise, the system selects in a step 532 the last countermeasure taken as default, since it is the one that provides the highest RORI index and it terminates.

FIG. 5B depicts the process of selecting multiple countermeasures for complex attack scenarios (534). The process takes as input the results obtained from the evaluation of individual countermeasures (step 536), as described in FIG. 5A. The system then eliminates those countermeasures for which the RORI index is below the average or below a predefined threshold (step 538). This action helps the system optimize the evaluation process. The system then analyzes countermeasures that are totally restrictive, mutually exclusive and partially restrictive (step 540) in order to obtain the list of combinable countermeasures.

Then, it is possible to generate groups of 2, 3, . . . , n countermeasures, where "n" is the total number of elements to be combined (step 542). The RORI metric is then calculated for each combination (step 544), taking into account that for a combined solution, the cost is calculated as the sum of all the individual countermeasure costs and the risk mitigation of a combined solution is calculated as the probability of the union of events. The Annual. Infrastructure Value and the Annual Loss Expectancy remains unchangeable for all combined solutions.

A determination is made as whether the resulting RORI is equal to the default value (step 546) i.e. the highest RORI value obtained in the Single Countermeasure Evaluation described in FIG. 5A), in such a case, the system compares the annual response cost (ARC) of this countermeasure against the ARC of the default countermeasure (step 548). A determination is then made as whether the ARC for the current countermeasure is equal or greater than the default one (step 550), in such a case, the system discards the countermeasure and search for another one to be analyzed (step 552); otherwise the countermeasure becomes the selected one (step 554), and it overrides the default RORI value.

In case the resulting RORI is different to the default one, a determination is made as whether the resulting RORI is greater than the default value (step 556). In such a case, the countermeasure becomes the selected one (step 554); otherwise, the system checks for another countermeasure to evaluate and the default RORI remains unchanged (step 552). A determination is made as whether there is another countermeasure to evaluate (step 558), in such a case, the process returns to step 544; otherwise, the system selects the last group of countermeasures taken as default, since it provides the highest RORI index (step 560) and it terminates.

Figure 6A:
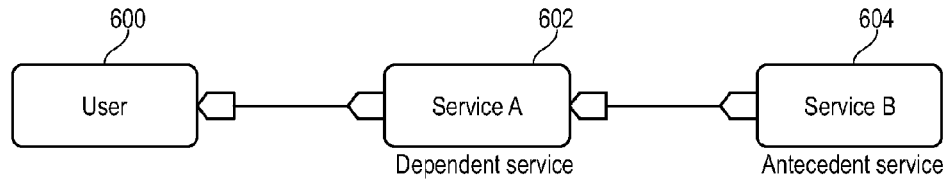
FIGS. 6A-6C are diagrams illustrating a number of different scenarios in which service dependencies can occur in accordance with aspects of the present invention.
Figure 6B:
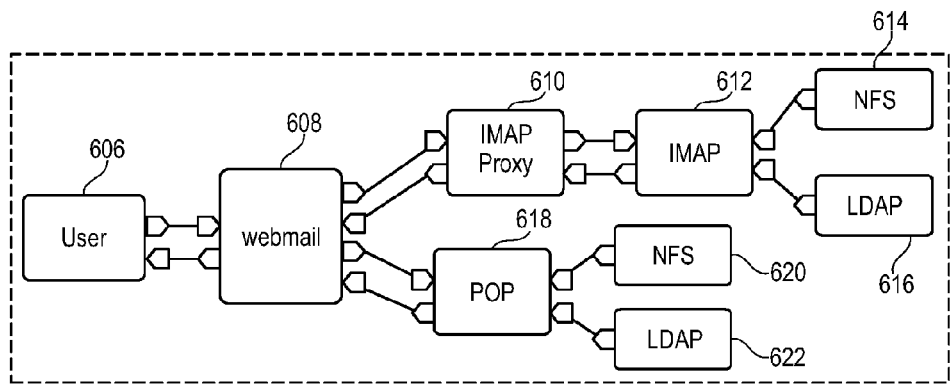
Figure 6C:
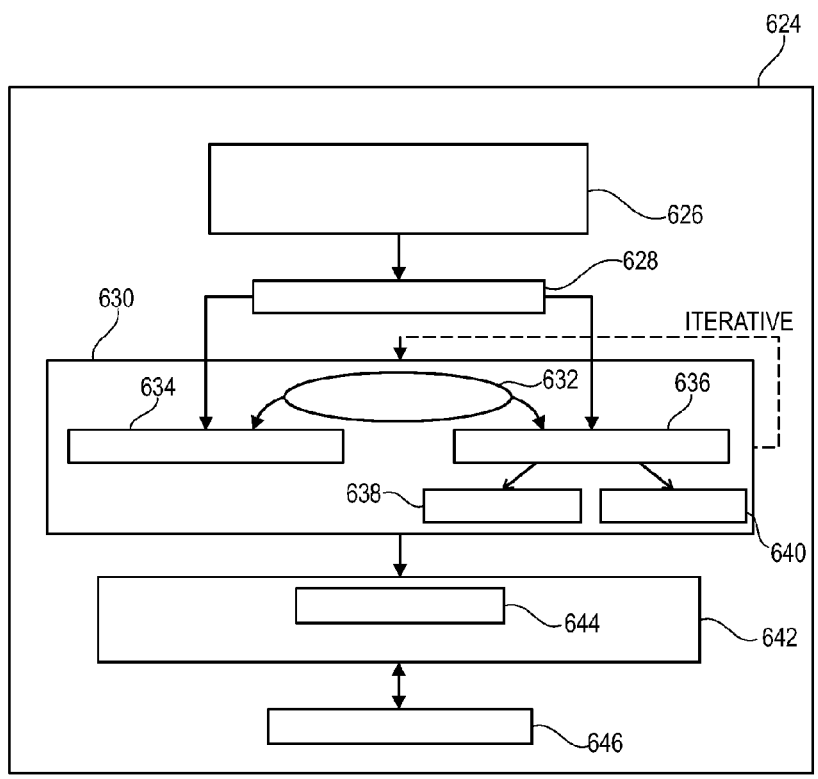

FIGS. 6A-6C are diagrams illustrating a number of different scenarios in which service dependencies can occur in accordance with aspects of the present invention. In particular, FIG. 6A represents an atomic entity in the dependency model composed of a user 600, a dependent service step 602, and an antecedent service step 604.

Service A 602 is said to be dependent on service B 604 when A requires a privilege that is provided by B. When this condition is met, A is the dependent service and B is the antecedent service. A dependency is satisfied when the antecedent service is able to provide the access that is required by the dependent service. Failing to do so, either because of an accidental failure or a deliberate attempt to compromise the service, prevents the dependent service from acquiring the requested access. Therefore it degrades its proper behavior to a certain level. Therefore, the proper behavior of a dependent service is somehow conditioned by the proper behavior of its antecedent services.

FIG. 6B provides examples of webmail services and their high level dependencies. The first example is the one of the dependency between the pool services composed of IMAP-Proxy 610 and POP 618, and the webmail application 608. The dependent service uses the webmail application to send a confirmation email to its users 606. The pool service 610, 618 is assigned a login/password combination that is used to authenticate to the webmail application 608. The privilege that is requested through this dependency is the ability to send confirmation emails.

The second example is the one of the dependency between the POP 618 and either NFS 620 or LDAP services 622. The dependent service POP 618 accesses user accounts in order to authenticate a given user 606. User accounts are managed by the LDAP service 622 which controls access to these accounts. An account is created and a login/password combination for this account is added to the configurations of the POP service 618. The POP service 618 asks the LDAP service 622 for a particular user account. This account is provided by an email user when he authenticates to the POP service 618.

The third example is the one of the dependency between IMAP 612 and services such as NFS 614 or LDAP 616. The dependent service, i.e. IMAP 612 requires access to the mail boxes hosted by the antecedent service, i.e. the NFS service 614. IMAP 612 is trusted by NFS 614 because its IP address is included in the /etc/hosts.allow file. It thus uses the privilege of being connected to the Intranet with an appropriate IP address.

FIG. 6C describes a modular process 624 that enables gathering information about services and their dependencies within a single model. The process 624 makes use of a serviceDB package in a step 626 to set up the list of services and their features is the first step towards building the service dependency model. This step requires defining the elementary services that are represented in the model, as well as their interfaces and privilege assignments. The serviceDB package does not include information about service dependencies. It only classifies the services that are represented in the model, the access that is provided by each service and the requirements for this service in order to be fully operational. The definition of the serviceDB package is decorrelated from the remaining steps that constitute the framework workflow.

With the service dependency description in the step 628, the system defines the dependencies for the services in the serviceDB package in a step 630. This is an iterative and recursive process that defines, in a step 632, the direct dependencies, i.e. antecedents of each service. Service dependencies do not specify the internal behavior of a service, but only the interaction between this service and other antecedent services. A step 634 is implemented as a building blocks process that connects services in order to represent the topology of their dependencies. It does not require information about the inner service functionalities, i.e. service workflow, but only uses the service definitions specified in the serviceDB package.

Next, in a step 636, a service dependency workflow is defined on the system. Service workflow specifies in a step 638 the inner service functionalities, including the normal behavior of the already defined dependencies. It also specifies in a step 640 the impact of access failures on the dependent service. Service features and workflow, in contrast to the service topology, determine the intrinsic service properties, which are independent of a particular dependency configuration. Nonetheless, they specify the way a dependent service accesses its own dependencies.

At the end of the process, a complete service dependency model is obtained. The OSATE tool validates in a step 642 the dependency model and translates this model into an AADL-XML interchange representation. The multi-file dependency model is indexed in a step 644 by the serviceDB.aaxl file. In a step 646, the Java-based query interface interacts with the dependency model, accessing the different service packages referenced in the serviceDB.aaxl file in order to retrieve relevant dependency information.

Figure 7:
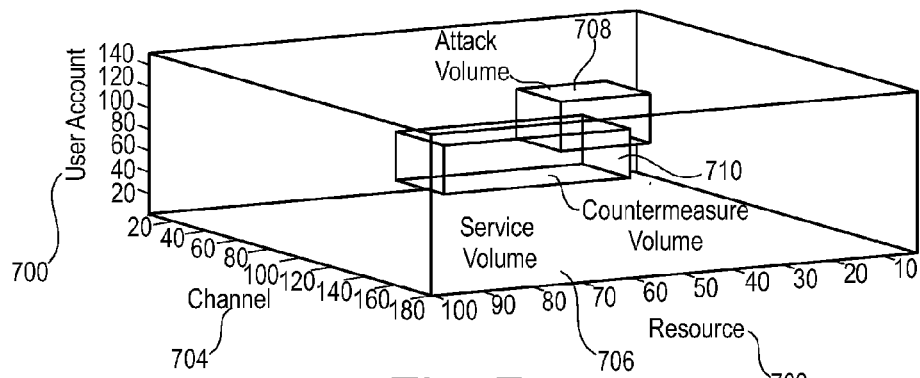
FIG. 7 is an exemplary representation of an information system volume that includes the volume of one attack and one countermeasure in accordance with aspects of the present invention.

FIG. 7 is an exemplary representation of the volume of a service that includes the volume of one attack and of one countermeasure in accordance with aspects of the present invention. The model is composed of 3 axes: User account 700, Channel 702, and Resource 704. The projection of the 3 axes represents a volume 706 that encompasses the risk at which the service is exposed and represents the maximal space a given service is exposed to attacks. This volume includes tangible assets (e.g., PCs, mobile phones, network components, etc.), as well as intangible assets (e.g., confidential information, business reputation, etc) that are vulnerable to known and unknown threats. Alt these assets are represented in the service volume by three element types being the user accounts 700, resources 702, and/or channels 704. The attack volume 708 represents the portion of the service volume 706 that is being targeted by a given attack that exploits some of the service's vulnerabilities. The countermeasure volume 710 represents the level of action that a security solution has on a given service. It is the percentage of the service volume 706 that is covered and controlled by a given countermeasure. An attack is covered by a countermeasure if their volumes overlap. The countermeasure can exceed the attack volume 708 and cover part of the service volume 706 that is not compromised by the attack.

Figure 8A:
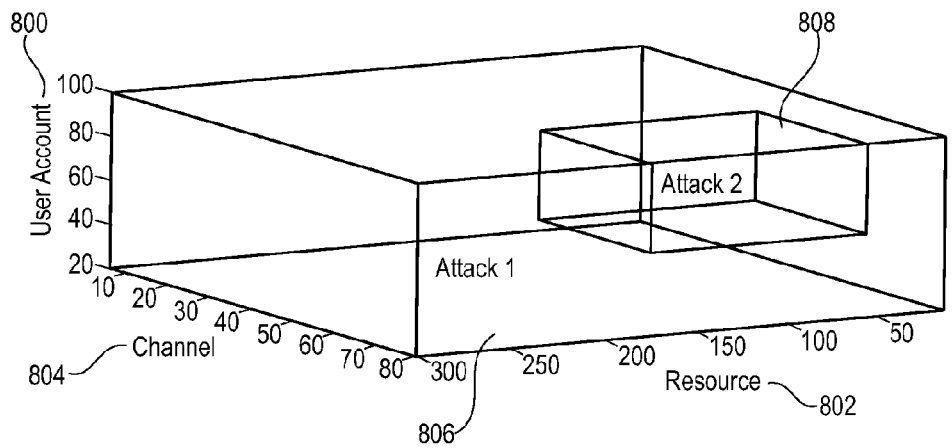

FIGS. 8A-8D are graphical representations of a number of different scenarios in which multiple and/or complex attacks directed at a system can occur in accordance with aspects of the present invention. In particular, FIG. 8A depicts the volume of two totally joint attacks. Attack 1 (806) and attack 2 (808) compromise particular user accounts 800, resources 802, and channels 804 on the information system. The volume of attack2 (808) is totally covered by the volume of Attack1 (806), therefore, countermeasures against attack1 (806) are useful to be implemented against attack2 (808). If for instance, attack 1 (806) has as target the IP address range [172.20.0.1-172.20.15.254], and attack 2 (808) has as target the IP address range [172.20.4.1905-172.20.4.240], only attack 1 (806) is analyzed since it targets a wider range of IP addresses which includes those of attack 2 (808), therefore, the same countermeasures are proposed to face both attacks.

Figure 8B:
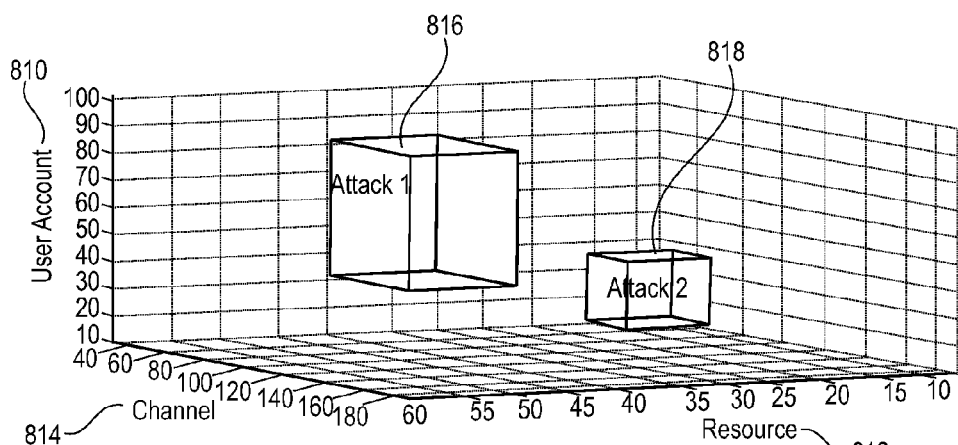

FIG. 8B illustrates a general case when two attacks are totally disjoint. Attack 1 (816) and attack 2 (818) compromise different elements on the information system (i.e., user accounts 810, resources 812, and channels 814). The volumes of both attacks are disjoint since they have no target in common. Both attacks are treated individually, assuming that countermeasures for attack 1 (816) do not generate conflicts with those for attack 2 (818). The volume of attack 1 (816) is therefore independent of the volume of attack 2 (818).

Figure 8C:
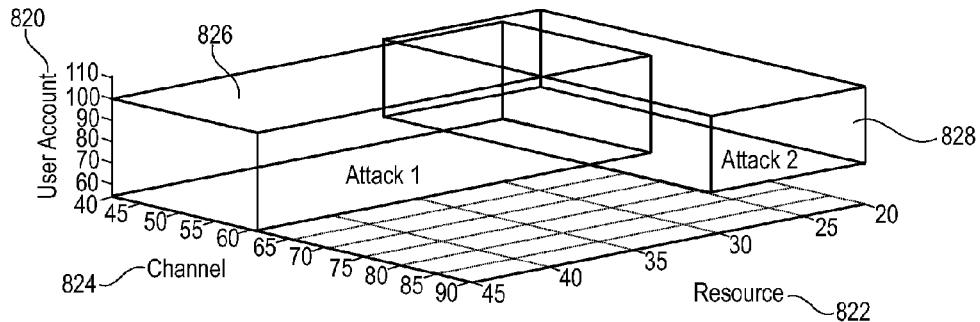

FIG. 8C illustrated the volume of two partially covered attacks. Attack 1 (826) targets particular user accounts 820, resources 822, and channels 824. Some of these elements are also targeted by Attack 2 (828). When the volume of a given attack is partially covered by the volume of another attack, countermeasures against one attack are not sufficient to mitigate the total attack volume.

Figure 8D:
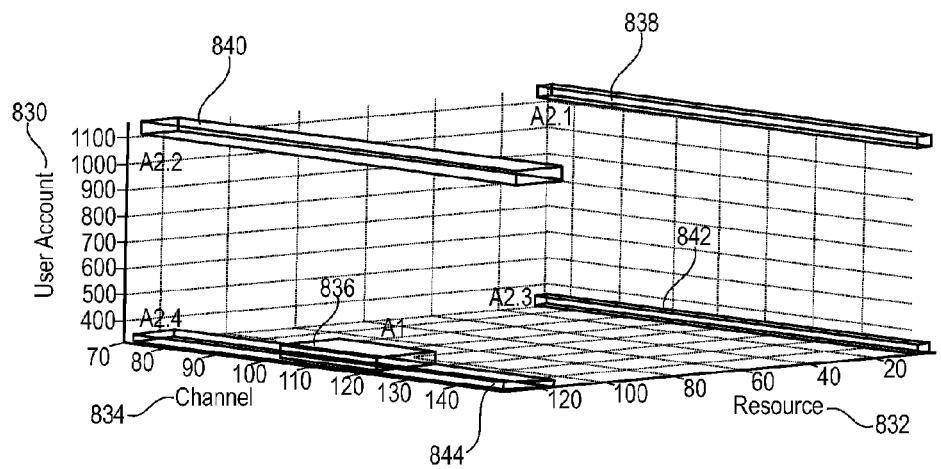

FIG. 8D depicts the volume of two partially covered attacks, one of them represented by four parallelepipeds. Attack 1 (836) targets particular user accounts 830, resources 832, and channels 834. Some of these elements are also targeted by a portion A2.4 of Attack2, which is composed of four disjoint volumes i.e. A2.1 (838), A2.2 (840), A2.3 (842), and A2.4 (844). The volume of the combined attacks is calculated as the union of all the attack volumes minus the intersection volume of attack1 (836) and attack A2.4 (844). By interposing the geometric representation of both attacks, it is possible to identify the user accounts 830, resources 832, and channels 834 that are present in both attacks. Then, the union of the combined attack is calculated as the sum of the individual attack volumes mines their intersection.

EXAMPLE

Figure 9:
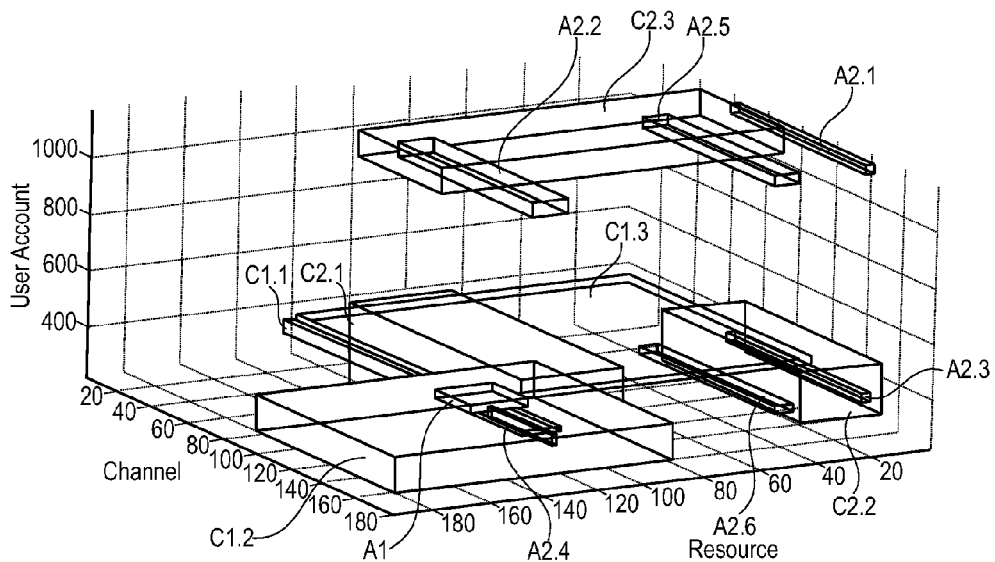
FIG. 9 is an example of a graphical representation of a system, attacks and countermeasures in accordance with aspects of the present invention.

An example of a service for which the volumes of the service, the attacks and the countermeasures are displaced in a 3-axes coordinate system as defined above is illustrated in FIG. 9.

The three axes correspond respectively to the user accounts, the channels and the resources of the system exposed to the attacks.

TABLE II

| Element | User Account | Channel | Resource | Volume(units$^3$) |
|---|---|---|---|---|
| Service S | U1:U3691 | Ch1:Ch4512 | R1:R993 | 430,106,901,440 |
| Attack 1 | U340:U377 | Ch100:Ch120 | R110:R130 | 904,932 |
| Attack 2 | U320:U349 & U1110:U1159 | Ch70:Ch149 | R5:R9 & R31:R40 & R115:R127 | 8,380,800 |
| CM 1.1 | U300:U349 | Ch1:Ch149 | R121:R123 | 1,206,900 |
| CM 1.2 | U301:U433 | Ch100:Ch179 | R94:R193 | 57,456,000 |
| CM 1.3 | U330:U360 | Ch1:Ch110 | R1:R119 | 25,411,320 |
| CM 2.1 | U229:U550 | Ch50:Ch110 | R94:R130 | 35,124,840 |
| CM 2.2 | U270:U449 | Ch70:Ch149 | R1:R30 | 56,052,000 |
| CM 2.3 | U1030:U1130 | Ch40:Ch90 | R1:R123 | 14,551,218 |

In this example as detailed in TABLE II., two attacks attack A1 and attack A2 are detected against the service S.

The attacks affect respective elements of the above defined element types.

The volume of the first attack A1, as illustrated in FIG. 9, comprises a single portion A1 while the volume of the second attack A2 comprises six disjoint portions being respectively A2.1, A2.2, A2.3, A2.4, A2.5 and A2.6.

Seven countermeasures C0, C1.1, C1.2, C1.3, C2.1, C2.2, and C2.3 are proposed against the attacks A1 and A2. Detailed description of the seven countermeasures is shown in TABLE III here below.

TABLE III

| Countermeasure | Description | RM | RORI |
|---|---|---|---|
| C0 | No operation | 0.00 | 0.00% |
| C1.1 | Behavioral detection | 0.02 | −21.80% |
| C1.2 | Install Antivirus | 0.21 | 31.64% |
| C1.3 | Make all shares "read only" | 0.15 | 4.19% |
| C2.1 | Install patches | 0.18 | 15.27% |
| C2.2 | Clock C&C domains | 0.22 | 42.31% |
| C2.3 | Create signatures IDS | 0.03 | −32.78% |

The seven countermeasures are evaluated on the basis of their risk mitigation level and the RORI. As shown in TABLE III, both in terms of and of RORI, the best ranked countermeasure is C2.2, followed by C1.2 and C2.1.

The simulation thus starts by simulating the impacts of the countermeasure C2.2 on the service S and the depending services.

If C2.2 does not degrade the system beyond a tolerable degree, C2.2 will be selected. Otherwise, the process continues to simulating the impacts of the countermeasure C1.2 to determine the degree of the damage of C1.2. The process goes on this way until obtaining a countermeasure that has a degree of damage within the tolerable degree, and the corresponding countermeasure is selected.

The invention is not limited to the above illustrated embodiment.

For example, the method may comprise also calculating the risk mitigation level of a combination of a plurality of countermeasure and simulating an impact of said combination of the plurality of countermeasures.

The method may also be applied once a cyber attack is detected, in order to prevent propagation of the attack within the system and to the depending services of the system Alternatively, the method may be applied to before detection of an attack, in order to protect the system from potential cyber attacks.

The invention claimed is:

1. A method of selecting, for at least one service of an information system and depending service(s), at least one countermeasure to be implemented against at least one cyber attack, the method comprising:

identifying elements of the service exposed to the cyber attack(s), calculating a risk mitigation level of each countermeasure with respect to the cyber attack(s), ranking the countermeasure(s) on the basis of a parameter which is at least a function of the risk mitigation level, simulating the impact of the countermeasure(s) on the service and the depending service(s), the countermeasure to be implemented being selected at least as a function of result of the simulation, wherein the simulation comprises generating at least one information concerning a degree of damage of the corresponding countermeasure to the service and/or to its depending services, and wherein the risk mitigation level is calculated as a function of at least a volume of the countermeasure and of the attack(s), wherein the volumes of the countermeasure and of the attack(s) are calculated in an n-axes coordinate system with n being an integer superior to 2, the axes of the n-axes coordinate system corresponding to element types of the elements exposed to the attack(s), the element types being selected among user account, resource, and channel of the service.

2. The method according to claim 1, comprising identifying depending service(s) of said at least one service.

3. The method according to claim 2, the risk mitigation level being calculated as a function of at least a coverage of the countermeasure, the coverage being a ratio between an intersecting volume of the volume of the countermeasure and of the attack(s), and the volume of the attack(s).

4. The method according to claim 1, n being equal to 3 and the method comprising displaying the volumes of the attacks and of the countermeasures in the 3 axes coordinate system.

5. The method according to claim 4, the 3 axes being respectively the user accounts, the channels and the resources of the service.

6. The method according to claim 1, comprising implementing the selected countermeasure on the information system.

7. The method according to claim 1, comprising selecting, for a plurality of services of the system, at least one common countermeasure to be implemented against at least one cyber attack.

8. A method of selecting, for at least one service of an information system and depending service(s), at least one countermeasure to be implemented against at least one cyber attack, the method comprising:

identifying elements of the service exposed to the cyber attack(s), calculating a risk mitigation level of each countermeasure with respect to the cyber attack(s), ranking the countermeasure(s) on the basis of a parameter which is at least a function of the risk mitigation level, simulating the impact of the countermeasure(s) on the service and the depending service(s), the countermeasure to be implemented being selected at least as a function of result of the simulation, wherein the simulation comprises generating at least one information concerning a degree of damage of the corresponding countermeasure to the service and/or to its depending services, and wherein the risk mitigation level is calculated as a function of at least a volume of the countermeasure and of the attack(s), wherein the volumes of the countermeasure and of the attack(s) are calculated in an n-axes coordinate system with n being an integer superior to 2, wherein in the case when there is more than one attack, calculating the union and intersection of the attacks, for calculating a risk mitigation level of each countermeasure with respect to a combination of the attacks.

9. The method according to claim 8, comprising calculating and displaying a volume of the service in the 3 axes coordinate system.

10. A method of selecting, for at least one service of an information system and depending service(s), at least one countermeasure to be implemented against at least one cyber attack, the method comprising:

identifying elements of the service exposed to the cyber attack(s), calculating a risk mitigation level of each countermeasure with respect to the cyber attack(s), ranking the countermeasure(s) on the basis of a parameter which is at least a function of the risk mitigation level, simulating the impact of the countermeasure(s) on the service and the depending service(s), the countermeasure to be implemented being selected at least as a function of result of the simulation, wherein the simulation comprises generating at least one information concerning a degree of damage of the corresponding countermeasure to the service and/or to its depending services, and wherein the risk mitigation level is calculated as a function of at least a volume of the countermeasure and of the attack(s), wherein the volumes of the countermeasure and of the attack(s) are calculated in an n-axes coordinate system with n being an integer superior to 2, wherein in the case when there is more than one countermeasure, calculating the union and intersection of the countermeasures.

11. The method according to claim 10, comprising selecting a combination of countermeasures.

* * * * *